(12) United States Patent
Wessel

(10) Patent No.: US 6,588,296 B2
(45) Date of Patent: Jul. 8, 2003

(54) INTEGRATED TWIST GRIP SHIFTER

(75) Inventor: Robert Wessel, Würzburg (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/864,543

(22) Filed: May 24, 2001

(65) Prior Publication Data

US 2002/0002871 A1 Jan. 10, 2002

(30) Foreign Application Priority Data

May 25, 2000 (DE) .......................................... 100 25 883

(51) Int. Cl.[7] ................................................. F16C 1/10
(52) U.S. Cl. ..................................................... 74/502.2
(58) Field of Search ........................... 74/551.1, 551.9, 74/502.2; 403/289, 290, 338, 344

(56) References Cited

U.S. PATENT DOCUMENTS

| | | | | |
|---|---|---|---|---|
| 3,453,899 A | * | 7/1969 | Tarutani et al. | ............... 474/82 |
| 4,191,065 A | * | 3/1980 | Golobay et al. | .......... 123/182.1 |
| 4,828,535 A | | 5/1989 | Sinoquet | ...................... 474/80 |
| 5,134,897 A | * | 8/1992 | Romano | .................. 74/473.13 |
| D351,776 S | | 10/1994 | Schuchard et al. | .......... D8/303 |
| 5,579,848 A | * | 12/1996 | Hsu | ............................. 16/422 |
| 5,588,925 A | | 12/1996 | Arbeiter et al. | ............... 474/81 |
| 5,682,963 A | * | 11/1997 | Tang | ........................ 188/2 D |
| 5,802,927 A | * | 9/1998 | Yu et al. | ....................... 74/489 |
| 6,021,688 A | * | 2/2000 | Chang | ...................... 74/473.28 |
| 6,209,413 B1 | * | 4/2001 | Chang | ....................... 74/489 |
| 6,276,231 B1 | * | 8/2001 | Yamane | ....................... 74/489 |
| 6,282,976 B1 | * | 9/2001 | Jordan et al. | .................. 474/82 |

FOREIGN PATENT DOCUMENTS

| | | | |
|---|---|---|---|
| DE | 44 20 125 | 1/1996 | .......... B62M/25/04 |
| EP | 0 272 947 | 6/1988 | .......... B62M/25/04 |
| EP | 0 575 560 | 12/1993 | .......... B62M/25/04 |
| EP | 0 671 315 | 9/1995 | .......... B62K/23/04 |
| EP | 0 700 827 | 3/1996 | .......... B62M/25/04 |

* cited by examiner

Primary Examiner—David A. Bucci
Assistant Examiner—Vicky A. Johnson
(74) Attorney, Agent, or Firm—Milan Milosevic; Lisa Wunderlich

(57) ABSTRACT

The invention relates to a twist grip shift which is arranged preferably in the grip region of a handle bar, is secured with a clip and has the purpose of activating bicycle transmissions. The shift components such as the grip end part, the twist grip part, the take-up reel and the shift housing are arranged about a central bearing tube and form one complete grip unit. The clip prevents a releasable connection between the bearing tube and the shift housing from opening in the mounted state. The advantage of this shift design lies in the increase in protection against undesired release of the releasable connection. The components which are joined in the premounted state are securely lined up on the bearing tube.

12 Claims, 6 Drawing Sheets

INTEGRATED TWIST GRIP SHIFTER

BACKGROUND OF THE INVENTION

1. Field of the Invention

The present invention relates to an integrated twist grip shift for shifting gears of a bicycle transmission such as multistage hub transmissions or derailleurs.

2. Description of the Related Art

A twist grip shift for controlling a bicycle transmission is disclosed in European Patent EP 0700827 and includes a shift housing with a shift mechanism, a clamping device to be secured to a handlebar of the bicycle, a rotatable take-up reel coupled to a bearing tube for the elastic twist grip part, and a grip end part which is seated on the handlebar so that it is fixed with respect to rotation relative to the handlebar and is also elastic. The separate grip end part is as a rule an elastomer tube which is mounted on the handlebar in a frictionally locking manner and essentially transmits the manual supporting forces onto the handlebar and prevents unintentional shifting operations. A plastic intermediate ring may additionally be arranged between the rotatable twist grip part and the fixed elastomer tube to reduce the friction therebetween.

The twist grip part, the separate grip end part and the intermediate ring are individually fitted onto the handlebar and secured during the final mounting operation, with an appropriate degree of effort in terms of assembly and adjustment.

Since the separate grip end part is connected to the handlebar only by friction, there is a remote possibility that the hand together with the separate grip end part may slip off the handlebar during a critical situation.

SUMMARY OF THE INVENTION

The object of the present invention is to provide a twist grip shift with an integrated attachment of the grip end part such that the entire twist grip shift is supplied and mounted as a functional unit. The object is achieved by an integrated twist grip shift mountable on a handlebar tube of a bicycle for activating a bicycle transmission via a Bowden cable including a bearing tube, a twist grip part rotatably arranged on the bearing tube, a shift housing mountable on the handlebar tube and connected to the bearing tube via a releasable connection such that the shift housing is axially nondisplaceable and rotatably fixed relative to the shift housing. The twist grip shift further includes a clip arrangeable in a blocking position in the shift housing for securing the shift housing on the handlebar tube, the releasable connection being blocked by the clip when the clip is in the blocking position such that the releasable connection is releasable only when the clip is removed from the blocking position.

A further object of the present invention is to increase the protection of the twist grip shift during use by avoiding undesired displacement of the grip end part up with the possibility of slipping off the handlebar.

The present invention includes a bearing tube having elastic tongues. The elastic tongues have locking profiles at their respective ends which project in the radial direction to form a positively locking connection with a corresponding profile on a shift housing which protects against twisting and displacement. These elastic tongues allow the twist grip part, the take-up reel and the shift housing to be lined up with the shift mechanism and premounted as an assembly on the bearing tube. This assembly is protected against coming apart unintentionally by the connection between the bearing tube and shift housing. This appreciably reduces the number of twist grip components to be made available and to be mounted for final mounting on the handlebar. The entire twist grip shift is an integral unit which is ready for mounting. A clip is arranged in the internal diameter of the shift housing and may be tightened with an associated screw. Tightening the screw on the clip ensures a secure seat of the twist grip shift including the grip end part on the handlebar. The bearing tube and the twist grip part with the take-up reel are prevented from being dismounted again or disconnected from the shift housing until the clip is removed. To ensure a play-free seat on the handlebar, the internal diameter on the bearing tube and on the grip end part are given appropriately tight dimensions or tolerances. Selective deformation of the internal region may also be used to alleviate the tolerance sensitivity. For example, the inner face of the bearing tube may be of an oval or polygonal shape, instead of circular, to achieve a play-free seat during the adaptation to the round cross section. The oval or polygonal shape is preferably arranged in a region axially adjacent to the elastic tongues. The same effect may alternatively be achieved if the inner region of the bearing tube is equipped with narrow elevations which run essentially in the axial direction. The narrow elevations are deformed during mounting and then seated tightly to provide a play-free seat. Openings may be provided on the bearing tube in the region of the covering of the grip end part so that material projects into the internal diameter of the bearing tube when the grip end part is applied thereto. The material is then appropriately deformed and pressed on during the final mounting of the assembly on the handlebar.

The bearing tube is lengthened in the direction of the grip end part. The grip end part is secured on the bearing tube with a chemical overmolding connection. In contrast to the described prior art, the bearing tube of the present invention not fixed in terms of rotation to the elastic twist grip part and the take-up reel. Rather, the bearing tube of the present invention serves merely as a bearing for the take-up reel and forms, with a fixed intermediate ring, the necessary axial stop for the twist grip part which is fixedly connected in terms of rotation to the take-up reel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
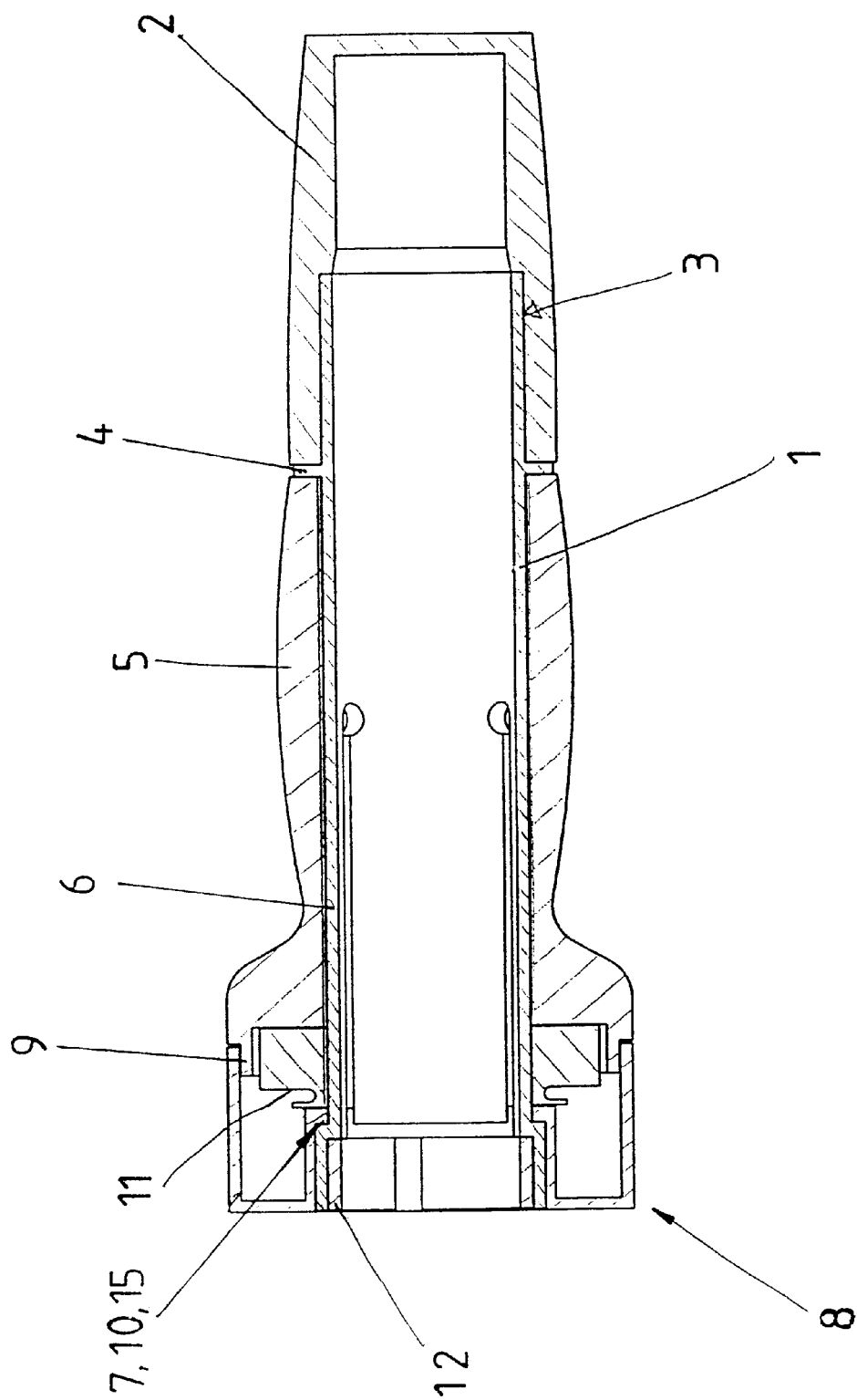
FIG. 1 is longitudinal sectional view of a twist grip part according to an embodiment of the present invention with grip and shift components arranged about a bearing tube.

A longitudinal sectional view of a twist grip shift according to the present invention is shown in FIG. 1. The components thereof are essentially arranged around a bearing tube 1 made of, for example, a rigid plastic material. The internal diameter of the bearing tube 1 is dimensioned to ensure a play-free seat on a bicycle handlebar. A grip end part 2 made of an elastomer material is rigidly connected to the bearing tube 1 via an overmolding connection 3 such that the grip end part is fixed with respect to rotation relative to the bearing tube 1. The section of the grip end part 2 which projects beyond the bearing tube 1 has a smaller internal diameter than the bearing tube 1 so that the grip end part 2 is seated free of play or with tension against the end of the handlebar. The external contour of the grip end part 2 has a slightly crowned shape for ergonomic considerations.

An intermediate disk 4 is fixedly seated on the bearing tube 1. Alternatively, the intermediate disk 4 may be manufactured as one piece with the bearing tube 1. A twist grip part 5 is arranged on the bearing tube 1 so that the intermediate disk 4 is arranged between the grip end part 2 and the twist grip part 5. This intermediate disk 4 provides an axial stop for the grip end part 2 and the twist grip part 5 and reduces the axial friction which otherwise occurs between the grip end part 2 and the twist grip part 5.

Figure 5:
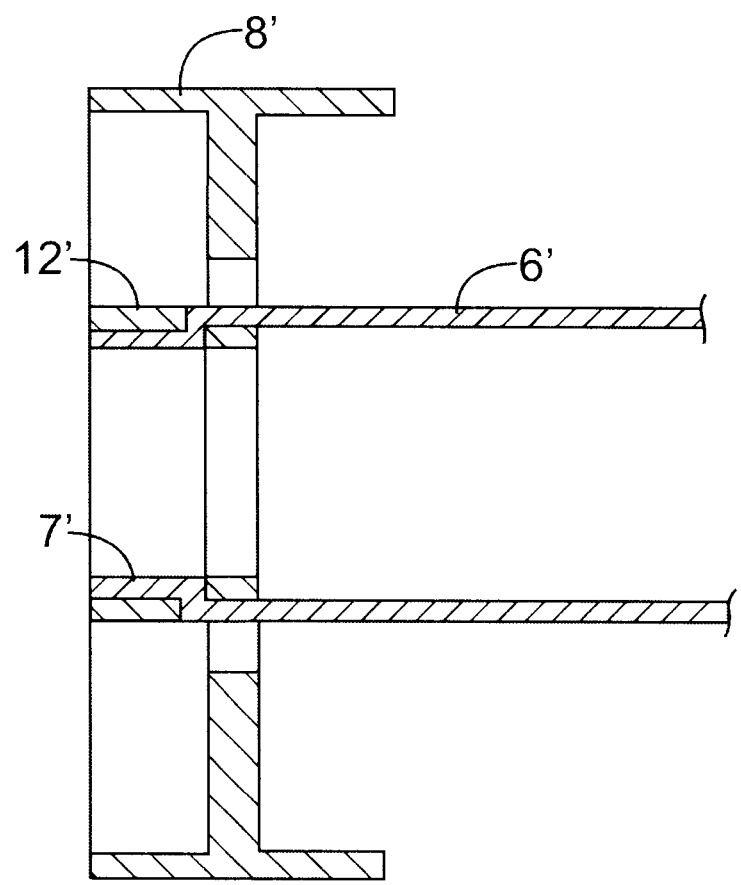
FIG. 5 is a partial longitudinal sectional view of a further embodiment of a twist grip part according to the present invention.
Figure 6:
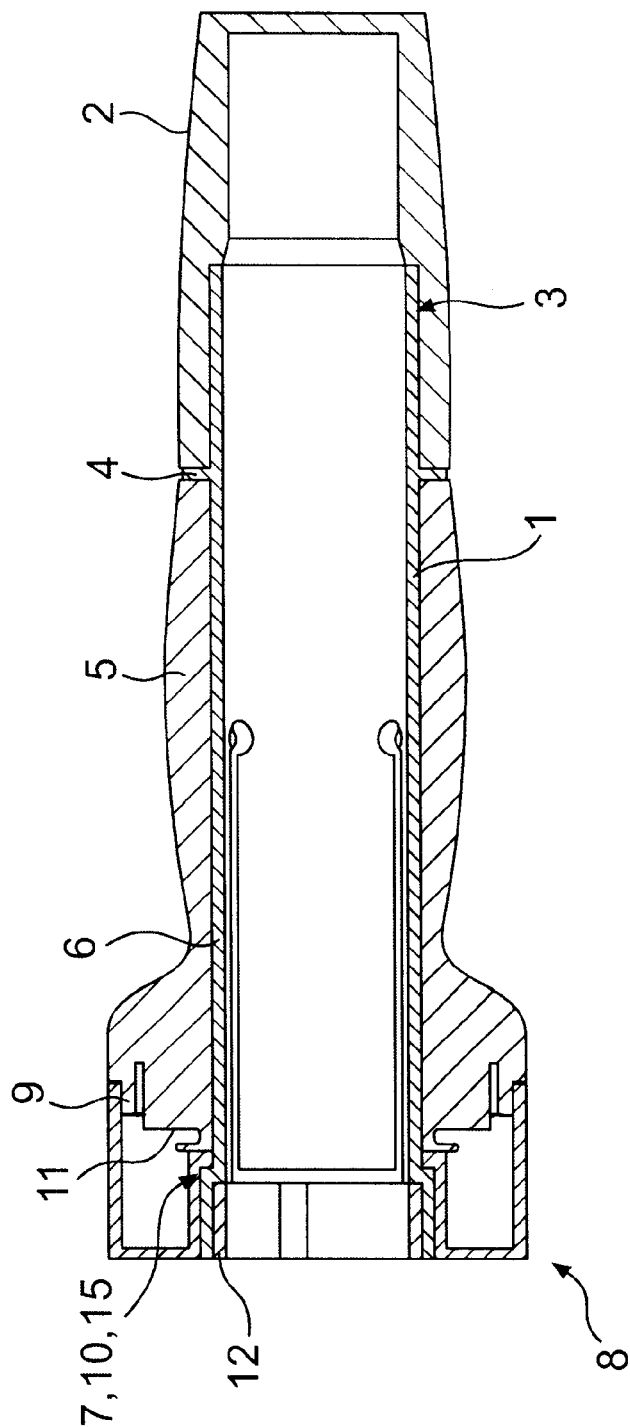
FIG. 6 is a longitudinal sectional view of a twist grip part according to another embodiment of the present invention.

Two elastic tongues 6 are arranged on the bearing tube 1 with locking profiles 7 projecting in the radial direction. The elastic tongues 6 and the locking profile 7 may be deflected inward for insertion in a shift housing 8. The elastic tongues 6 and locking profile 7 form a snap-action connection 10 with corresponding profiles in the shift housing 8. The twist grip part 5 and a take-up reel 11 may be threaded onto the bearing tube 1 over the elastic tongues 6 during premounting and are then protected against undesired stripping off. When the locking profiles 7 are fully inserted into the shift housing 8 so that they are in a snapped-in position, a clip 12 is inserted axially into the shift housing 8 within the elastic tongues 6. The clip 12 prevents the elastic tongues from being deflected inward and thus protects the twist grip against twisting or displacement after final mounting on the handlebar. As an alternative, the twist grip shift may be designed such that clip 12' is arranged on a radially outer side of the locking profiles 7' of the elastic tongues 6' as shown in FIG. 5. In this embodiment, the clip 12' prevents elastic tongues 6' from deflecting radially outward for removal from the shift housing 8'. Referring back to the embodiment of FIG. 1, a screw (not shown here) is tightened on the clip 12 to hold it in place. The shift housing 8 and the twist grip part 5 with the take-up reel 11 are prevented from being dismounted until the clip 12 is removed. An edge 9 of the twist grip part 5 facing the shift housing 8 projects into the shift housing 8 and forms an appropriate seal which may be embodied as a labyrinth. The length and the internal diameter of the twist grip part 5 are dimensioned such that easy rotation on the bearing tube 1 is ensured. The take-up reel 11 is fixedly connected in terms of rotation to the twist grip part 5 and forms a common component with the twist grip part 5. The take-up reel 11 and twist grip part 5 may be embodied integrally as one unit as shown in FIG. 6. The external shape of the twist grip part 5 is crowned in the grip region. Alternatively, the twist grip part may have an ergonomic grip contour adapted to the hand.

Figure 2:
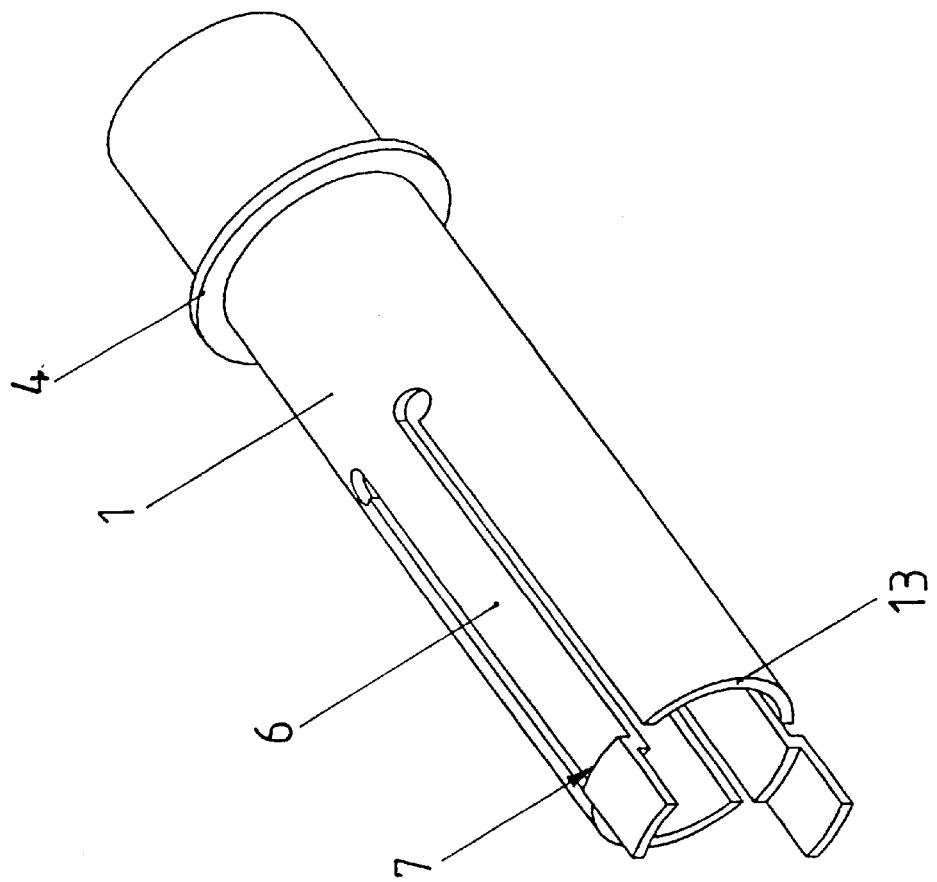
FIG. 2 is a perspective view of a bearing part of the twist grip of FIG. 1 with a fixed intermediate disk and elastic tongues equipped with a locking profile.

FIG. 2 is a perspective view of the bearing tube 1 with the integrated intermediate disk 4. The junction with the elastic tongues 6 in the radial direction is rounded to avoid a notch effect. The elastic tongues 6 have a locking profile 7 at their free ends. In the tensile direction, the bearing tube 1 is secured in the shift housing 8 with the locking profile 7. In the pushing direction, the bearing tube 1 is supported on the shift housing 8 by end faces 13.

Figure 3:
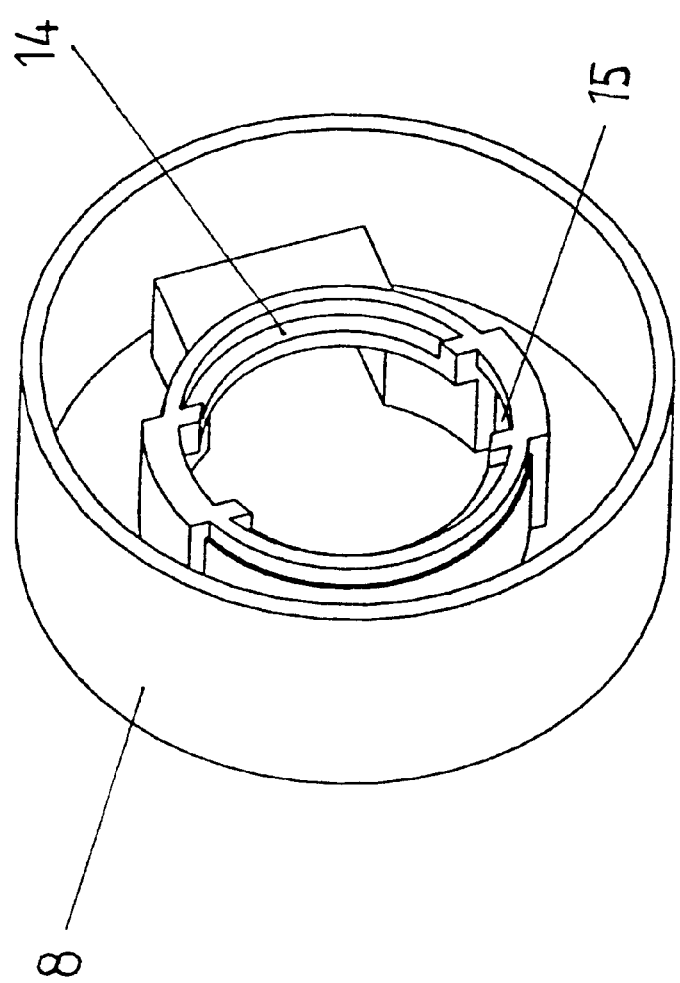
FIG. 3 is a perspective view of a shift housing of the twist grip of FIG. 1 with corresponding faces for holding the locking profile against the elastic tongues.

FIG. 3 is a perspective view of the shift housing 8 with a stop 14 arranged for supporting the end face 13 on the bearing tube 1. The locking profile 7 on the elastic tongues 6 is taken up by a corresponding profile 15. This prevents twisting and pulling out of the bearing tube in the mounted state and ensures secure mounting on the handlebar after the clip 12 is attached.

Figure 4:
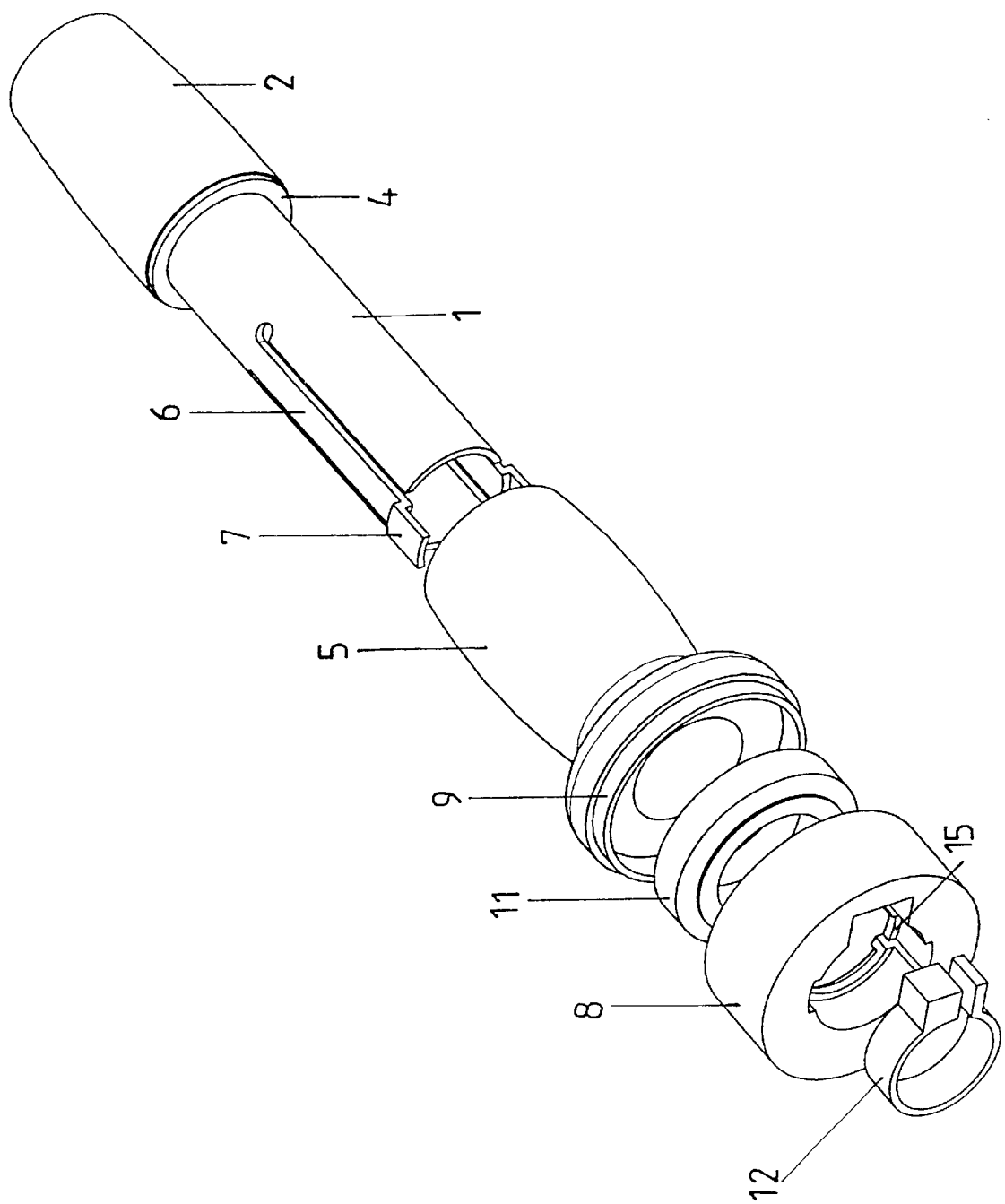
FIG. 4 is an exploded view of the components of the twist grip of FIG. 1 before premounting as an assembly.

FIG. 4 is an exploded view of the components of the twist grip shift before mounting. The grip end part 2 is already rigidly connected to the bearing part 1. The elastic tongues 6 with the locking profiles 7 are pressed together until they fit through the internal diameter of the twist grip part 5 and of the take-up reel 11 and clip into the recesses of the corresponding profiles 15 on the housing 8 which contains the rest of the shift mechanism. After the clip 12 has been inserted into the shift housing 8 and a screw (not shown here) has been attached, the premounting of the twist grip shift is completed and the assembly may thus be attached to the handlebar in one piece. The shift gear may be directly attached to the take-up reel 11. Alternatively, the shift gear may be attached through a window in the shift housing 8 during at a later time of the premounting operation. The premounted twist grip shift forms a compact physical unit that cannot be dismounted without removing the clip 12 and pressing together the elastic tongues 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An integrated twist grip shifter mountable on a handlebar tube of a bicycle for activating a bicycle transmission via a Bowden cable, comprising:

a bearing tube;

a twist grip part rotatably arranged on said bearing tube;

the bearing tube including a releaseable connection configured to releaseably engage said shift housing such that said bearing tube is axially nondisplaceable and rotatably fixed relative to said shift housing when so engaged;

a clip arrangeable in a blocking position in said shift housing for securing said shift housing on the handlebar tube, said releasable connection being blocked by said clip in said blocking position such that said releasable connection is releasable only when said clip is removed from said blocking position.

2. The integrated twist grip shifter of claim 1, wherein said releasable connection comprises at least one elastic tongue arranged on said bearing tube with a locking profile arranged on said at least one elastic tongue, said shift housing comprising a corresponding profile for receiving said locking profile.

3. The integrated twist grip shifter of claim 2, wherein said clip is arranged radially inside of said at least one elastic tongue in the blocking position thereby preventing a radial inward deflection of said at least one elastic tongue.

4. The integrated twist grip shifter of claim 2, wherein said clip is arranged radially outside of said at least one elastic tongue in the blocking position, thereby preventing a radially outward deflection of said at least one elastic tongue.

5. The integrated twist grip shifter of claim 2, wherein at least one elastic tongue springs out radially as a result of intrinsic tension as said bearing tube is inserted into said shift housing such that said locking profile snaps into the corresponding profile of said shift housing when the bearing tube is fully inserted in said shift housing.

6. The integrated twist grip shifter of claim 2, wherein said at least one elastic tongue is deformed in the radial direction during assembly of the components including said shift housing, said bearing tube and said clip, wherein said locking profile is pressed into said corresponding profile during the assembly.

7. The integrated twist grip shifter of claim 2, wherein said at least one elastic tongue of said bearing tube absorbs axial forces on said bearing tube in a tensile direction, said bearing tube further comprising at least one tubular segment lying adjacent said locking profile of said at least one elastic tongue resting in a precise recess in said shift housing such that said tubular segment absorbs axial compressive forces and rotary forces on said bearing tube and thereby prevents relative movements between said bearing tube and said shift housing.

8. The integrated twist grip shifter of claim 1, further comprising a take-up reel for activating the Bowden cable, wherein said twist grip part, said take-up reel and said shift housing are held onto said integrated twist grip by said releasable connection between said bearing tube and said shift housing.

9. The integrated twist grip shifter of claim 1, further comprising a grip end part and an intermediate disk arranged on said bearing tube, said intermediate disk providing an axial stop for said twist grip part and reducing friction between said grip end part and said twist grip part.

10. The integrated twist grip shifter of claim 1, further comprising a take-up reel for activating the Bowden cable, said shift housing further comprises a collar arranged adjacent to said take-up reel, wherein said twist grip part drives said take-up reel and an axial play of said twist grip part is determined by a length of said bearing tube.

11. The integrated twist grip shifter of claim 2, further comprising a take-up reel for activating the Bowden cable, a grip end part, and an intermediate disk arranged on said bearing tube, said intermediate disk providing an axial stop for said twist grip part and reducing friction between said grip end part and said twist grip part, said shift housing further comprising a collar arranged adjacent to said take-up reel, wherein said twist grip part drives said take-up reel and an axial play of said twist grip part is determined by one of a length of said bearing tube and a length between said intermediate disk and said locking profile on said bearing tube.

12. The integrated twist grip shifter of claim 1, further comprising a take-up reel for activating the Bowden cable, wherein said twist grip part and said take-up reel are embodied integrally as one unit.

* * * * *